United States Patent
Noda

(10) Patent No.: US 8,003,222 B2
(45) Date of Patent: Aug. 23, 2011

(54) RESIN COMPOSITION FOR FORMING ULTRAVIOLET ABSORBING LAYER AND LAMINATE COMPRISING ULTRAVIOLET ABSORBING LAYER

(75) Inventor: Nobuhisa Noda, Hashima (JP)

(73) Assignee: Nippon Shokubai Co., Ltd., Osaka (JP)

( * ) Notice: Subject to any disclaimer, the term of this patent is extended or adjusted under 35 U.S.C. 154(b) by 717 days.

(21) Appl. No.: 11/992,593

(22) PCT Filed: Sep. 27, 2006

(86) PCT No.: PCT/JP2006/319818
§ 371 (c)(1),
(2), (4) Date: Mar. 26, 2008

(87) PCT Pub. No.: WO2007/037501
PCT Pub. Date: Apr. 5, 2007

(65) Prior Publication Data
US 2009/0110936 A1    Apr. 30, 2009

(30) Foreign Application Priority Data

Sep. 27, 2005   (JP) .................................. 2005-280537

(51) Int. Cl.
*B32B 27/36* (2006.01)
*B32B 27/40* (2006.01)
*C08L 67/02* (2006.01)

(52) U.S. Cl. ....................... 428/480; 428/423.1; 524/418

(58) Field of Classification Search .................. 428/480, 428/423.1; 524/418
See application file for complete search history.

(56) References Cited

U.S. PATENT DOCUMENTS

| | | | | |
|---|---|---|---|---|
| 6,146,707 A | * | 11/2000 | Sapper et al. | ................. 427/409 |
| 6,372,355 B1 | | 4/2002 | Noda et al. | |
| 7,214,742 B2 | * | 5/2007 | Bolle et al. | ................... 525/437 |

FOREIGN PATENT DOCUMENTS

| | | | |
|---|---|---|---|
| JP | 57-169351 | | 10/1982 |
| JP | 7-278516 | | 10/1995 |
| JP | 9-300541 | | 11/1997 |
| JP | 10-175276 | | 6/1998 |
| JP | 11-40833 | | 2/1999 |
| JP | 11-348199 | | 12/1999 |
| JP | 2000-177070 | | 6/2000 |
| JP | 2002161158 A | * | 6/2002 |
| JP | 2003-107690 | | 4/2003 |
| JP | 2003-128730 | | 5/2003 |
| JP | 2004-126345 | | 4/2004 |

OTHER PUBLICATIONS

International Search Report issued Dec. 26, 2006 in the International (PCT) Application PCT/JP2006/319818 of which the present application is the U.S. National Stage.
Supplementary European Search Report dated Dec. 14, 2010 in European Application No. 06 81 1158, corresponding to present U.S. Application.
ii T .1- ./ Ca Taiwan Office Action (with English translation) issued May 5, 2011 in corresponding Taiwanese Application No. 095135505.

* cited by examiner

*Primary Examiner* — Thao T. Tran
(74) *Attorney, Agent, or Firm* — Wenderoth, Lind & Ponack, L.L.P.

(57) ABSTRACT

The object of the present invention is to find a resin composition for forming an ultraviolet absorbing layer having excellent adhesion to various plastic substrates such as polyester type films of PET etc. and provide a laminate of plastic substrate having no yellowing, excellent weather resistance and less curl formation with good productivity. There is provided a resin composition for use in forming an ultraviolet absorbing layer on the surface of a plastic substrate, having an ultraviolet absorbing polymer as a major component being synthesized from monomer mixtures containing an ultraviolet absorbing monomer, wherein the resin composition contains 0.5-5 parts by mass of a saturated polyester resin with a number-average molecular weight of 10000 or more and 0.1-30 parts by mass of a polyisocyanate based crosslinker relative to 100 parts by mass of the ultraviolet absorbing polymer, and a laminate with an ultraviolet absorbing layer made of the above composition formed on the surface of a plastic substrate.

2 Claims, No Drawings

RESIN COMPOSITION FOR FORMING ULTRAVIOLET ABSORBING LAYER AND LAMINATE COMPRISING ULTRAVIOLET ABSORBING LAYER

TECHNICAL FIELD

The present invention relates to a resin composition for forming an ultraviolet absorbing layer having excellent adhesion to plastic substrates and capable of preventing yellowing of films induced by ultraviolet light effectively, and a laminate suitable for optical applications having no yellowing, less curl formation with good productivity.

BACKGROUND ART

Plastic substrates used in various applications are generally weak to ultraviolet light, when being exposed continuously with sun light, they suffer from breakage of polymer main chain gradually, resulting in a gradual lowering of strength as a substrate. Thus, a lot of studies have been done on providing an absorbing layer of ultraviolet light for these plastic substrates (for example, Japanese Unexamined Patent Publication No. H11-40833, Japanese Unexamined Patent Publication No. 2003-107690 and Japanese Unexamined Patent Publication No. 2004-126345).

In particular, polyester type films typified by polyethylene terephthalate (PET) are excellent in dimensional stability, heat resistance, transparency, strength and the like, so that they are also used widely in optical applications, but, polyester for film ordinarily employs aromatic dicarboxylic acid as a raw material, and therefore, it contains an aromatic ring in the backbone of polyester. The aromatic ring is deteriorated and colored by ultraviolet light to generate yellowing of the film, so that an ultraviolet absorbing layer is required more than other plastics.

However, polyesters like PET crystallize easily, particularly, stretched films are poor in adhesion due to high crystalline orientation and have a weak adhesion to a layer to be laminated. Thus, ordinarily, polyester type films are subjected to adhesion enhancing treatments such as corona discharge treatment, plasma treatment, treatment using an alkali metal compound solution, high frequency sputter etching treatment and formation of easy adhesion layer (undercoat layer) to laminate an ultraviolet absorbing layer (e.g. Japanese Unexamined Patent Publication No. H11-348199). For example, while an untreated PET film has a surface wetting index of about 35 mN/m measured according to JIS K-6768 in 2004 version, when the adhesion enhancing treatment is conducted, the index can be increased to 50 mN/m or more; as a result, the adhesion to ultraviolet absorbing layers is remarkably improved.

However, there are many treatments with difficult condition arrangements in the above adhesion enhancing treatments, and there needs also an additional step, so that it is required to skip the adhesion enhancing treatment from the point of saving costs as well.

Also, in the inventions of Japanese Unexamined Patent Publication No. H11-40833, Japanese Unexamined Patent Publication No. 2003-107906 and Japanese Unexamined Patent Publication No. 2004-126345 described above, adhesion to untreated PET films is not sufficient, and some cases were poor in stability of resin liquids for forming ultraviolet absorbing layers. Further, crosslinkers requiring longer time and higher temperature to crosslink are used in some cases, so there existed a room for improvement from the point of saving costs.

Meanwhile in the fields of thin model display and mobile phone, in addition to cost cutting by shortening steps, further miniaturization of each of members i.e. thinner type and weight saving are required. Out of these members, there is a thin film having ultraviolet absorbing performance, and in the case of one side lamination on a substrate with an ultraviolet absorbing layer, upon hardening the ultraviolet absorbing layer, its volume shrinks to cause the film to curl remarkably in some cases. When such curl occurs, there have been problems that troubles take place upon lamination in the following step with other functional layers such as a hard coat layer and an adhesive layer, and films are abraded due to contact with rolls, and therefore, particularly, productivity of film in an optical application is remarkably lowered.

DISCLOSURE OF THE INVENTION

Thus, an object of the present invention is to find a resin composition for forming an ultraviolet absorbing layer having excellent adhesion to various plastic substrates firstly such as polyester type films of PET etc. and provide a laminate of plastic substrate having no yellowing, excellent weather resistance and less curl formation with good productivity.

The resin composition for forming an ultraviolet absorbing layer of the present invention that can solve the above problems is used to form an ultraviolet absorbing layer on the surface of a plastic substrate, has an ultraviolet absorbing polymer as a major component being synthesized from monomer mixtures containing an ultraviolet absorbing monomer and is characterized in that the resin composition contains 0.5-5 parts by mass of a saturated polyester resin with a number-average molecular weight of 10000 or more and 0.1-30 parts by mass of a polyisocyanate based crosslinker relative to 100 parts by mass of the ultraviolet absorbing polymer.

The laminate comprising an ultraviolet absorbing layer of the present invention is summarized as a laminate that an ultraviolet absorbing layer is formed on the surface of a plastic substrate, wherein the laminate has a yellowing factor $\Delta b$ of 2 or less before and after irradiation of ultraviolet light of 120 mW/cm$^2$ from the side of ultraviolet absorbing layer for 240 hours under an atmosphere of 80° C. and 60% RH and cross-cut adhesion between the plastic substrate and the ultraviolet absorbing layers of 95% or more.

The resin composition for forming an ultraviolet absorbing layer of the present invention contains a saturate polyester resin in a specific amount, so that an ultraviolet absorbing layer having excellent adhesion was able to be formed on various plastic substrates, in particular, even on untreated films on which adhesion enhancing treatment has not been carried out. As a result, a laminate having excellent yellowing resistance and less, curl formation and good productivity in low costs can be provided.

BEST MODE FOR CARRYING OUT THE INVENTION

The resin composition for forming an ultraviolet absorbing layer of the present invention can form an ultraviolet absorbing layer having speedy adhesion and excellent ultraviolet absorbing performance to even untreated plastic films having a surface wetting index of about 35 mN/m measured according to JIS K-6768 in 2004 version.

First, a plastic substrate of interest to be coated with a resin composition of the present invention is mainly a polyester type film. This polyester type film is a film obtained from polyester containing an aromatic ring potentially causing yellowing in the backbone chain as a raw material. The example, includes homopolyester films such as a polyethylene terephthalate (PET), polyethylene naphthalate and polybutylene terephthalate film, and also saturated polyester resin film described below. They may be a monoaxially stretched or a biaxially stretched film. Biaxially stretched PET films are available, for example O-PET manufactured by Kanebo Trinity Holdings, Ltd.

In addition, a resin composition of the present invention may be applied to films other than polyester type films. Examples of the plastic substrate film include polyethylene, polypropylene, triacetyl cellulose, polyacrylate, polymethylmethacrylate, polystyrene, polycarbonate, polyether sulfone, cellophane, aromatic polyamide, polyvinyl alcohol, ABS, polyacetal, polyphenylene ether, polyphenylene sulfide, polyimide, polyamideimide, polyetherimide, polyether ether ketone and fluororesin films like polytetrafluoroethylene. There can be used optical resin film such as ARTON (registered trademark) manufactured by JSR Corporation, ZERONEX (registered trademark) manufactured by Zeon Corporation and OPTREZ (registered trademark) manufactured by Hitachi Chemical Co., Ltd. Further, there may be used a polymer film having a lactone structure as shown in the following general formula (1):

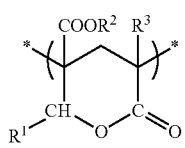

(1)

wherein $R^1$, $R^2$ and $R^3$ each independently represent a hydrogen atom or an organic residual group with a carbon number of 1-20. Additionally, an organic residual group may contain an oxygen atom. As the above organic residual group, an alkyl group with a carbon number of 1-20, an alkenyl group, a cycloalkylene group and an aromatic ring can be listed. Conventionally known additives may be added to these substrate films including sheets.

It is preferable that a plastic substrate of interest in the present invention has a surface wetting index (JIS K-6768) of less than 36 mN/m.

Next, a resin composition for forming an ultraviolet absorbing layer of the present invention will be described. The resin composition has an ultraviolet absorbing polymer as a major component being synthesized by radical polymerization from monomer mixtures containing an ultraviolet absorbing monomer as an essential raw material component.

As the ultraviolet absorbing monomer of essential raw material component in an ultraviolet absorbing polymer, there is preferably listed a benzotriazole based monomer shown in the following formula (2).

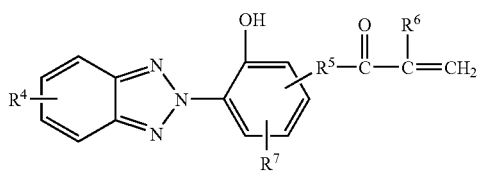

(2)

wherein $R^4$ represents a hydrogen atom, a halogen atom, an alkyl group with a carbon number of 1-8, an alkoxy group with a carbon number of 1-4, a cyano group or a nitro group, $R^5$ represents a linear or branched alkylene group having an element with a carbon number of 1-12, —$R^8$—O—; $R^8$ represents a linear or branched alkylene group with a carbon number of 2 or 3, or a group having an element capable of forming a hydrogen bond, $R^6$ represents a hydrogen atom or a methyl group, and $R^7$ represents a hydrogen atom or a hydrocarbon group with a carbon number of 1-8.

In addition, the group capable of forming a hydrogen bond denoted as $R^5$ is a group that forms a hydrogen bond between polymer molecules after synthesis and has an enhancing function of mechanical properties of coating such as flex resistance and water resistance; specifically, the examples include —NH—, —$CH_2NH$—, —$OCH_2CH(OH)CH_2O$—, and $CH_2CH_2COOCH_2CH(OH)CH_2O$—.

Preferable examples of the benzotriazole based monomer shown in the above formula (1) are 2-[2'-hydroxy-5'-(meth)acryloyloxymethylphenyl]-2H-benzotriazole, 2-[2'-hydroxy-5'-(meth)acryloyloxyethylphenyl]-2H-benzotriazole, 2-[2'-hydroxy-5'-(meth)acryloyloxypropylphenyl]-2H-benzotriazole, 2-[2'-hydroxy-5'-(meth)acryloyloxyhexylphenyl]-2H-benzotriazole, 2-[2'-hydroxy-3'-tert-butyl]-5'-(meth)acryloyloxyethylphenyl]-2H-benzotriazole, 2-[2'-hydroxy-5'-(β-(meth)acryloyloxyethoxy)-3'-tert-butylphenyl]-5-tert-butyl-2H-benzotriazole, 2-[2'-hydroxy-3'-(meth)acryloylaminophenyl]-2H-benzotriazole, 2-[2'-hydroxy-3'-(meth)acryloylaminomethylphenyl]-2H-benzotriazole, 2 [2'-hydroxy-3'-(meth)acryloylamino-5'-tert-octylphenyl]-2H-benzotriazole, 2-[2'-hydroxy-3'-(meth)acryloylaminomethyl-5'-tert-octylphenyl]-2H-benzotriazole, 2-[2'-hydroxy-3'-tert-octyl-5'-(meth)acryloylaminophenyl]-2H-benzotriazole, 2-[2'-hydroxy-3'-tert-octyl-5'-(meth)acryloylaminomethylphenyl]-2H-benzotriazole, and 2-[2'-hydroxy-5'-(3-(meth)acryloyloxy-2-hydroxypropoxy)-3'-tert-butylphenyl]-2H-benzotriazole. These can be used alone or in a mixture of two or more kinds thereof.

In the present invention, a benzophenone based monomer with a benzophenone bone structure having an ultraviolet absorbing performance shown in the following formula (3) can be used as an ultraviolet absorbing monomer.

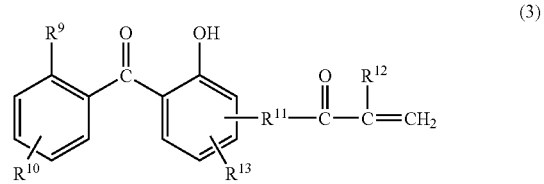

(3)

wherein $R^9$ represents a hydrogen atom or a hydroxyl group, $R^{10}$ represents a hydrogen atom or an alkoxy group with a carbon number of 1-6, $R^{11}$ represents —O—, $OCH_2CH_2O$—, —$OCH_2CH(OH)CH_2O$—, $R^{12}$ represents a hydrogen atom or a methyl group, and $R^{13}$ represents a hydrogen atom or a hydrocarbon group with a carbon number of 1-8.

Examples of the benzophenone based monomer include 2-hydroxy-4-[2-(meth)acryloyloxy]ethoxybenzophenone, 2,2'-dihydroxy-4-[2-(meth)acryloyloxy]ethoxybenzophenone, 2-hydroxy-3-tert-butyl-4-[2-(meth)acryloyloxy] ethoxybenzophenone, and 2-hydroxy-4-[2-hydroxy-3-(meth)acryloyloxy]propoxybenzophenone.

Also, a triazine based ultraviolet absorbing monomer shown in the following formula (4) can be used.

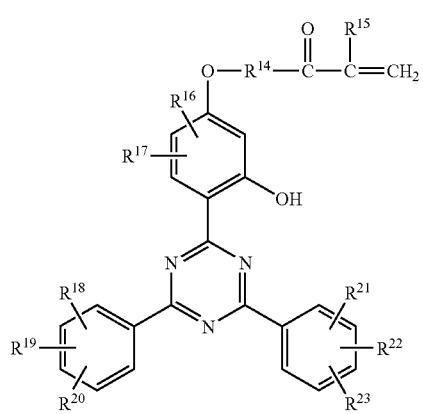

(4)

wherein $R^{14}$ represents a direct bond, —$(CH_2CH_2O)n$— or —$CH_2CH(OH)$—$CH_2O$—, n represents an integer of 1 to 5, $R^{15}$ represents a hydrogen atom or a methyl group, $R^{16}$ through $R^{23}$ each independently represent a hydrogen atom, an alkoxy group, an alkenyl group and an alkyl group having a carbon number of 1 to 10.

Examples of the triazine based monomer include 2,4-diphenyl-6-[2-hydroxy-4-(2-acryloyloxyethoxy)phenyl]-s-triazine, 2,4-bis(2-methylphenyl)-6-[2-hydroxy-4-(2-acryloyloxyethoxy)phenyl]-s-triazine, and 2,4-bis(2-methoxyphenyl)-6-[2-hydroxy-4-(2-acryloyloxyethoxy)phenyl]-s-triazine.

In the case of synthesis of ultraviolet absorbing polymer of the present invention, a monomer having an ultraviolet stability group (ultraviolet stability monomer) may be used in addition to the above ultraviolet absorbing monomer. In particular, when an ultraviolet absorbing monomer and an ultraviolet stability monomer are concomitantly used, the resultant polymer has both ultraviolet absorption and ultraviolet stability, which provides a prolonged weather resistance. The kind of ultraviolet stability monomer is not particularly limited, as long it has both a polymerizable double bond and ultraviolet stability group in a molecule, but particularly preferable is a monomer shown in the following formula (5).

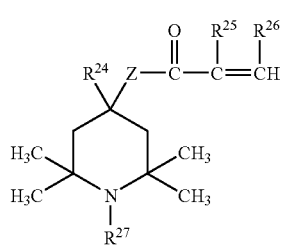

(5)

wherein $R^{24}$ represents a hydrogen atom or a cyano group, $R^{25}$ and $R^{26}$ each independently represent a hydrogen atom or a methyl group, $R^{27}$ represents a hydrogen atom or an alkyl group, and Z represents an oxygen atom or an imino group.

Examples of the monomer represented by the above formula (5) include, but not limited to, 4-(meth)acryloyloxy-2,2,6,6-tetramethylpiperidine; for example, Adekastab LA87 manufactured by Adeka Corporation, 4'-(meth)acryloylamino-2,2,6,6-tetramethylpiperidine, 4-(meth)acryloyloxy-1,2,2,6,6-pentamethylpiperidine, for example, Adekastab LA82 manufactured by Adeka Corporation, 4-(meth)acryloylamino-1,2,2,6,6-pentamethylpiperidine, 4-cyano-4-(meth)acryloylamino-2,2,6,6-tetramethylpiperidine, 4-crotonoyloxy-2,2,6,6-tetramethylpiperidine, and 4-crotonoylamino-2,2,6,6-tetramethylpiperidine, and these ultraviolet stability monomers may be used alone, and if desired, suitably in combination of two or more kinds thereof.

In the case of synthesis of ultraviolet absorbing polymer of the present invention, it is preferable to copolymerize the above ultraviolet absorbing monomer and ultraviolet stability monomer as well if necessary with monomers without ultraviolet absorbing performance (referred to other monomers). Characteristics of ultraviolet absorbing polymer obtained can be variously changed by choosing the kind and amount of other monomers.

Regarding other monomers, it is preferable to use a monomer containing a hydroxyl group in order to introduce a crosslinking point with a polyisocyanate based crosslinker into a polymer. The examples include monomers containing a hydroxyl group such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, and caprolactone modified hydroxyl (meth)acrylate, for example, Prakcel F series manufactured by Daicel Chemical Industries Ltd.

(Meth)acrylates capable of synthesizing a polymer having excellent weather resistance and having good copolymerization capability with the ultraviolet absorbing monomers exemplified above are also preferred. The examples are listed as follows: methyl (meth)acrylate, ethyl (meth)acrylate, n-propyl (meth)acrylate, isopropyl acrylate, n-butyl (meth)acrylate, isobutyl (meth)acrylate, sec-butyl (meth)acrylate, tert-butyl (meth)acrylate, amyl (meth)acrylate, isoamyl (meth)acrylate, heptyl (meth)acrylate, n-octyl (meth)acrylate, isooctyl (meth)acrylate, 2-ethylhexyl (meth)acrylate, cyclohexyl (meth)acrylate, nonyl (meth)acrylate, isononyl (meth)acrylate, isodecyl (meth)acrylate, dodecyl (meth)acrylate, tridecyl (meth)acrylate, n-lauryl (meth)acrylate, n-stearyl (meth)acrylate, isostearyl (meth)acrylate, dicyclopentanyl (meth)acrylate, isobornyl (meth)acrylate, 2-acetoacetoxyethyl (meth)acrylate, for example, Eastman AAEM manufactured by Eastman Corporation, and phenoxyethyl (meth)acrylate. These can be used alone or in a mixture of two or more kinds thereof.

As other monomers, there can be used the following various kinds of monomers:

vinyl esters such as vinyl acetate, vinyl butyrate, vinyl caproate, vinyl caprylate, vinyl caprate, vinyl laurate, vinyl myristate, vinyl palmitate, vinyl stearate, vinyl cyclohexane carboxylate, vinyl pivalate, vinyl octylate, vinyl monochloroacetate, divinyl adipate, vinyl methacrylate, vinyl crotonate, vinyl sorbate, vinyl benzoate and vinyl cinnamate;

monomers containing silicon such as vinyltrichlorosilane, vinyltris(β-methoxyethoxy)silane, vinyltrimethoxysilane, vinyltriethoxysilane, γ-(meth)acryloxypropyltrimethoxysilane and trimethylsiloxyethyl (meth)acrylate;

monomers containing halogen such as trifluoroethyl (meth)acrylate, 2,2,3,3-tetrafluoropropyl (meth)acrylate, hexafluoropropyl (meth)acrylate, octafluoropentyl (meth)acrylate, heptadodecafluorodecyl (meth)acrylate, β-(perflorooctyl)ethyl (meth)acrylate, 3-chloro-2-hydroxypropyl (meth)acrylate, ethylene oxide adduct of tribromophenol (meth)acrylate and tribromophenyl (meth)acrylate;

monomers containing nitrogen such as (meth)acrylamide, methylene bis(meth)acrylamide, N-methylol (meth)acrylamide, (meth)acryloyloxyethyltrimethyl ammonium chloride, dimethylaminoethyl (meth)acrylate sulfate, ethylene oxide adduct of morpholine (meth)acrylate, N-vinyl pyridine, N-vinyl imidazole, N-vinyl pyrrole, N-vinyl pyrrolidone, N-vinyl oxazolidone, N-vinyl succinimide, N-vinylmethyl carbamate, N,N-methylvinylacetoamide and 2-isopropenyl-2-oxazoline;

multi-functional monomers such as ethylene glycol di(meth)acrylate, diethylene glycol di(meth)acrylate, polyethylene glycol di(meth)acrylate, propylene glycol di(meth)acrylate, polypropylene glycol di(meth)acrylate, polyethylene glycol-propylene glycol di(meth)acrylate, 1,4-butanediol di(meth)acrylate, 1,6-hexanediol di(meth)acrylate, neopentylglycol di(meth)acrylate, glycerin di(meth)acrylate, 2-hydroxy-1,3-di(meth)acryloxypropane di(meth)acrylate, 2,2-bis[4-(meth)acryloxydiethoxyphenyl]propane di(meth)acrylate, 2,2-bis[4-(methacryloxypolyethoxy)phenyl] propane di(meth)acrylate, ethylene oxide modified bisphenol-A di(meth)acrylate, and propylene oxide modified bisphenol-A di(meth)acrylate trimethylol propane tri(meth)acrylate;

vinyl ethers such as vinyl methyl ether, vinyl ethyl ether, vinyl isopropyl ether, vinyl n-propyl ether, vinyl isobutyl ether, vinyl n-butyl ether, vinyl n-amyl ether, vinyl isoamyl ether, vinyl 2-ethylhexyl ether, vinyl n-octadecyl ether, cyanomethyl vinyl ether, 2,2-dimethylaminoethyl vinyl ether, 2-chloroethyl vinyl ether, β-difluoromethyl vinyl ether, benzyl vinyl ether, phenyl vinyl ether, divinyl ether and divinyl acetal;

monomers containing an epoxy group such as glycidyl (meth)acrylate, α-methylglycidyl acrylate, α-methylglycidyl methacrylate, for example, MGMA manufactured by Daicel Chemical Industries Co., Ltd., 3,4-epoxycyclohexylmethyl acrylate, for example, Cyclomer A400 manufactured by Daicel Chemical Industries Co., Ltd., 3,4-epoxycyclohexylmethyl methacrylate, for example, Cyclomer M100 manufactured by Daicel Chemical Industries Co., Ltd.; and monomers containing an acidic functional group such as sulfoethyl (meth)acrylate, 2-(meth)acryloyloxyethyl acid phosphate and 2-(meth)acryloyloxypropyl acid phosphate.

When an ultraviolet absorbing polymer of the present invention is synthesized from a monomer mixture, various kinds of monomers are preferably within the following range. Additionally, each monomer has a preferable use-amount target in a total amount of monomers used of 100% by mass in the following explanation.

The ultraviolet absorbing monomer is preferably 5% by mass (5 mass %) or more, more preferably 10 mass % or more, further preferably 30 mass % or more, and 80 mass % or less, more preferably 70 mass % or less, further preferably 50 mass % or less. This range provides a sufficient, ultraviolet absorbing performance and can prevent a polyester type film from yellowing for a long period of time. When an ultraviolet stability monomer is used, it is preferably 0.1 mass % or more, more preferably 0.5 mass % or more, and 20 mass % or less, more preferably 10 mass % or less. A monomer containing a hydroxyl group is preferably 2 mass % or more, more preferably 4 mass % or more and 35 mass % or less, more preferably 25 mass % or less.

Also, other monomers are used as the remaining of the above monomers. From the point of enhancing physical properties of ultraviolet absorbing layer, methyl methacrylate and cyclohexyl methacrylate are preferred.

A polymerization method for synthesizing an ultraviolet absorbing polymer of the present invention is not particularly limited, and known polymerization methods can be used such as solution polymerization, bulk polymerization, aqueous solution polymerization, suspension polymerization and emulsion polymerization methods. The solution polymerization method is preferable because the resultant reaction product can be as it is or diluted to obtain a resin composition of the present invention.

As a solvent used in the solution polymerization, there can be used toluene, xylene, other aromatic type solvents; alcohol type solvents such as n-butyl alcohol, propylene glycol methyl ether, diacetone alcohol and ethyl cellosolve; ester type solvents such as butyl acetate, ethylacetate and cellosolve acetate; ketone type solvents such as methyl ethyl ketone, methyl isobutyl ketone and cyclohexanone; and dimethyl formamide. The kind of solvent used is not limited thereto. These solvents may be used alone or in a mixed solvent of two or more kinds thereof. The amount of solvent used may be suitably determined in view of monomer concentration, desired molecular weight of polymer and polymer solution concentration.

As a polymerization initiator usable in the solution polymerization, the examples that can be used include known radical polymerization initiators such as 2,2'-azobis-(2-methylbutyronitrile), tert-butylperoxy-2-ethylhexanoate, 2,2'-azobisisobutyronitrile, benzoyl peroxide and di-tert-butyl peroxide. The amount of polymerization initiator used is not particularly limited, but it is preferably 0.01 mass % or more, 50 mass % or less, and more preferably 0.05 mass % or more, 20 mass % or less relative to the total of monomers. Also, if required, a chain transfer agent like n-dodecylmercapton may be added in one or more kinds to adjust molecular weight of polymer.

Temperature in the polymerization reaction is also not particularly limited, but it is preferably in a range of room temperature to 200° C., and more preferably in a range of 40 to 140° C. Additionally, reaction time can be suitably chosen to complete polymerization reaction efficiently according to the composition of monomer mixture and kind of polymerization initiator to be used.

Regarding the molecular weigh of ultraviolet absorbing polymer, a weight-average molecular weight (Mw) is preferably 10000 or more and more preferably 20000 or more. When Mw is too small, adhesion to a substrate becomes insufficient. The upper limit is preferably 300000, and more preferably 200000. When Mw exceeds 300000, it is not preferable because stability of resin liquid after polyisocyanate based crosslinker is compounded will be lowered.

Next, saturated polyester resin will be described. Examples of the saturated polyester resin that can be used include (co)polycondensates obtained by known methods of one or more kinds of polyhydric alcohol components such as ethylene glycol, propylene glycol, 1,3-butylene glycol, 1,4-butylene glycol, 1,6-hexanediol, diethylene glycol, dipropylene glycol, triethylene glycol, hydrogenated bisphenol-A, neopentyl glycol, 1,5-pentanediol, 3-methyl-1,5-pentanediol, 2-butyl-2-ethyl-1,3-propanediol, 1,4-cyclohexane dimethanol, 1,9-nonanediol, 2,2-dimethyl-3-hydroxypropionic acid, 2,2-dimethyl-3-hydroxypropyl, glycerin, trimethylol ethane, trimethylol propane, pentaerythritol; with one or more kinds of polycarboxylic acid components such as aromatic dicarboxylic acids such as terephthalic acid, isophthalic acid, naphtharene-1,4- or 2,6-dicarboxylic acid, and 5-sodiumsulfoisophthalic acid; aliphatic dicarboxylic acids such as adipic acid, azelaic acid, sebacic acid, 1,3-cyclohexane dicarboxylic acid and 1,4-cyclohexane dicarboxylic acid, and derivatives such as their dialkyl esters and diaryl esters Examples of commercially available saturated polyester resins to be used include Vylon series of 103, 240, 500, GK110, GK640 and GK880 (registered trademark) manufactured by Toyobo Co., Ltd., VYLONAL series of MD-1100, MD-1200, MD-1220, MD-1245 and MD-1500 (registered trademark) manufactured by Toyobo Co., Ltd., Nichigo polyester series of TP-220, TP-235, TP-236, TP-290, TP-249, WR-905 and WR-901 (registered trademark), manufactured by Nippon Synthetic Chemical Industry Co., Ltd., Espel series of 9940A, 9940B, 9940D, 9940E-37 and 9940A-37 (registered trademark) manufactured by Hitachi Chemical Co., Ltd.

A number-average molecular weight Mn of saturated polyester resin is preferably 10000 or more. When Mn is less than 10000, adhesion to a substrate becomes insufficient. In addition, curl resistance also tends to be lowered. The Mn is more preferably 20000 or more.

The saturated polyester resin may preferably have a glass transition temperature of higher than 50° C., more preferably higher than 60° C. When the saturated polyester resin has a glass transition temperature of not higher than 50° C., the blocking property of ultraviolet absorbing coatings may be deteriorated and the adhesion of ultraviolet absorbing coatings after the weather resistance test may be reduced.

The third essential component of the present invention is a polyisocyanate based crosslinker. It undergoes crosslinking reaction with a hydroxyl group introduced into an ultraviolet absorbing polymer by a monomer containing the foregoing hydroxyl group to enhance weather resistance, strength and chemical resistance of ultraviolet absorbing layer. Other crosslinkers such as melamine resin need a higher temperature and/or longer time to complete the crosslinking reaction, which is not preferable and also easily leads to yellowing.

The polyisocyanate based crosslinker is not particularly limited as long as it contains two or more isocyanate groups in a molecule, and there can be listed well known diisocyanate compounds such as tolylene diisocyanate (TDI) and 4,4'-diphenylmethane diisocyanate (MDI); buret polyisocyanate compounds such as Sumidur N (registered trademark); polyisocyanate compounds containing an isocyanurate ring(s) such as Desmodur IL (registered trademark), Desmodur HL, manufactured all by Sumika Bayer Urethane Co., Ltd. and Colonate EH (registered trademark) manufactured by Nippon Polyurethane Industry Co., Ltd.; adduct polyisocyanate compounds like Sumidur L manufactured by Sumika Bayer Urethane Co., Ltd. adduct polyisocyanate compounds like Colnate L and Colonate L-55E manufactured all by Nippon Polyurethane Industry Co., Ltd. These can be used alone or in combination of two or more kinds thereof. A so called block isocyanate compound that the isocyanate group of the above compounds is reacted with a masking agent having active hydrogen to be deactivated can also used.

In a resin composition for forming an ultraviolet absorbing layer of the present invention, regarding a formulation ratio of each of essential components, a saturated polyester resin is of 0.5-5 parts by mass relative to 100 parts by mass of the ultraviolet absorbing polymer. Less amount of saturated polyester resin lowers the adhesion to a substrate and curl resistance. The lower limit is more preferably 1 part by mass. However, when a content of saturated polyester resin exceeds 5 parts by mass, it is not preferable because the ultraviolet absorbing layer itself becomes visible yellowing due to the operation of aromatic ring in the saturated polyester resin. The ultraviolet absorbing layer also becomes soft to be easily abraded. Further, the stability of resin liquid after crosslinker formulation is lowered.

Here, a polyisocyanate based crosslinker is of 0.1-30 parts by mass (dry content) relative to 100 parts by mass of the ultraviolet absorbing polymer. Less crosslinker lowers the adhesion to a substrate, whereas in exceeding 30 parts by mass, the stability of resin liquid after crosslinker formulation is lowered. The upper limit is more preferably in 20 parts by mass.

A resin composition for forming an ultraviolet absorbing layer of the present invention can be obtained by suitably mixing these solvents for synthesis of ultraviolet absorbing polymer or the usable solvents exemplified as a medium. A resin composition may contain other additives. The examples include ordinary additives in a coating field: organic class ultraviolet absorbents such as benzotriazole type, benzophenone type, triazine type and indole type, inorganic class ultraviolet absorbents such as zinc oxide; addition type ultraviolet stabilizers such as steric hindrance piperidine compounds like Tinuvin 123, Tinuvin 144 and, Tinuvin 765 manufactured by Chiba Specialty Chemicals Corporation; leveling agents, antioxidants, fillers like talc, antirusts, fluorescent whitening agents, antioxidants, antistatic agents, pigments, dyes, thickeners, inorganic particles like colloidal silica and alumina sol, acryl based fine particles like polymethylmethacrylate type. In the case of using these other additives, the amount of ultraviolet absorbing polymer of the present invention in an ultraviolet absorbing layer is preferably used in 50 mass % or more, more preferably 80 mass % or more, and further preferably 90 mass % or more.

A laminate of the present invention can be produced by coating the above resin composition on a plastic substrate using known coating methods such as immersion, spraying, brush coat, curtain-flow coat, gravure coat, roll coat, spin coat, bar coat and electrostatic coating. Drying temperature can be chosen suitably to solvent.

According to Lambert-Beer law, thickness of ultraviolet absorbing layer depends on the amount of ultraviolet absorbing group introduced into polymer, namely the amount of ultraviolet absorbing monomer used in polymerization. Accordingly, the thickness of layer can be determined in consideration of the amount of ultraviolet absorbing group in the polymer, weather resistance and ultraviolet absorbing performance required in a laminate layer containing an ultraviolet absorbing layer. Ordinarily, it is in a range of 0.5-20 µm. When thickness is more than 20 µm, it takes time to dry coating and curl resistance is also lowered. Reversely, when thickness is less than 0.5 µm, it is difficult to coat uniformly on a substrate and there is a risk of insufficient ultraviolet absorbing performance. The lower limit of thickness is more preferably 1.0 µm and the upper limit is more preferably 15 µm.

The ultraviolet absorbing layer obtained by the resin composition for forming a ultraviolet absorbing layer of the present invention is excellent in ultraviolet absorbing performance, and a laminate having a substrate on which the ultraviolet absorbing layer is formed is excellent in yellowing resistance. A target of yellowing resistance for a laminate was considered as good yellowing resistance (◯: good) if the laminate had a yellowing factor Δb of less than 2 before and after irradiation of ultraviolet light of 120 mW/cm² from the side of ultraviolet absorbing layer for 240 hours under an atmosphere of 80° C. and 60% RH. Specifically, using an ultraviolet deterioration accelerating tester: Eye Super UV tester UV-W131 manufactured by Iwasaki Electric Co., Ltd., b values before and after irradiation of ultraviolet light of 120 mW/cm² from the side of ultraviolet absorbing layer for 240 hours under an atmosphere of 80° C. and 60% RH (relative humidity) were measured by a spectral color difference meter: SE-2000 manufactured by Nippon Denshoku Co., Ltd. by a reflection method according to JIS K 7105 (2004 version), and the difference of b values before and after irradiation was defined as a yellowing, factor Δb. The Δb is preferably 1.5 or less and more preferably 1, or less. Additionally, in examples described below, the results were evaluated as partly inferior (Δ) for Δb of 2 or, more, less than 4, and as inferior (x) for Δb of 4 or more.

The ultraviolet absorbing layer of the present invention firmly adheres to a substrate. Adhesion is evaluated by a cross-cut adhesion test, and it can be said to be excellent for 90%, or more. Specifically, in accordance with JIS K 5600-5-6 (2004 version), from the side of ultraviolet absorbing layer of laminate, the laminate was scotched into 100 cross-cut pieces of 1 mm square up to a substrate through the ultraviolet absorbing layer by a cutter knife with a cutter guide of 1 mm spacing, and a cellophane adhesive tape: CT405AP-18 with 18 mm wide manufactured by Nichiban Co., Ltd. was attached to the scotched surface completely by rubbing with a rubber eraser from above, then peeled off vertically to observe with the naked eye how much the ultraviolet absorbing layer was left on the surface of substrate. The cross-cut adhesion was obtained by the following formula:

Cross-cut adhesion (%)=100×(1−area of peeled-off part)/area of evaluation=100−number of the pieces peeled off.

In addition, the adhesion test is conducted in an atmosphere of 25° C. The higher the number, the more excellent is the cross-cut adhesion.

The ultraviolet absorbing laminate obtained by using the resin composition for forming an ultraviolet absorbing layer of the present invention does not cause inconvenience like curl. Regarding curl resistance, an ultraviolet absorbing layer was formed on a plastic substrate, and in the case of coating, coated and dried, and within 30 minutes, the obtained laminate was placed in an atmosphere of 23° C. and 65% RH, and a specimen of 10 cm by 3 cm was cut out from the laminate, placed on a horizontal board having the ultraviolet absorbing layer upwards, and the distance between each of its four corners and the horizontal board, i.e. floating distance was measured; the total length was evaluated as good (○) for 0 mm or more, less than 3 mm, partly inferior (Δ) for 3 mm or more, less than 5 mm, and as inferior (x) for 5 mm or more.

EXAMPLES

The present invention will be described in detail with reference to Examples and Comparative examples below, but the present invention is not to be limited thereto, and can be suitably modified and conducted to the extent that is in conformity with the spirit described above and below, and are included in the technical scope of the present invention. Additionally, part and % in Examples and Comparative examples represent part by mass and mass %.

Synthesis Example 1

In a flask equipped with a stirring machine, a dropping funnel, a thermometer, a reflux condenser and a nitrogen gas introducing tube were loaded with 30 parts of 2 (2'-hydroxy-5'-methacryloyloxyethylphenyl)-2H-benzotriazole: RUVA93 (trade name; referred to UVA1) manufactured by Otsuka Chemical Co., Ltd., 57 parts of methyl methacrylate (MMA), 8 parts of 2-ethylhexyl acrylate (2EHA), 5 parts of 2-hydroxyethyl methacrylate (HEMA) and 70 parts of ethyl acetate, and heated with introducing a nitrogen gas while stirring to a reflux temperature. At the same time, in a initiator dropping tank, a mixture of 20 parts of ethyl acetate and, 1.0 parts of 2,2'-azobis(2-methylbutyronitrile) was loaded, and added dropwise into the flask over 2 hours. After completion of dropping, reflux reaction was continued, and after 6 hours from the start of dropping, cooled and diluted with ethyl acetate so that non-volatile part becomes 50%.

The thus obtained ultraviolet absorbing polymer 1 was measured for a weight-average molecular weight (Mw) by GPC: HLC8120 manufactured by Tosoh Corporation and using a column: TSK-GEL GMHXL-L manufactured by Tosoh Corporation, as a polystyrene reduced molecular weight. The results are shown in Table 1.

Synthesis Examples 2-7

Ultraviolet absorbing polymers were synthesized in the same manner as in Synthesis example 1 except that monomer composition and amount of initiator were changed as shown in Table 1 and that for Synthesis examples 3 and 5, dropping time of initiator solution was changed in 6 hours. The non-volatile part and Mw are shown in Table 1.

Additionally, in Table 1, UVA2 is, 2-hydroxy-4-(2-acryloyloxyethoxy)benzophenone, UVA3 is 2-[2-hydroxy-4-(2-methacryloyloxyethoxy)phenyl]-4,6-diphenyl-1,3,5-triazine, UVA4 is 2-(2H-benzotriazol-2-yl)-6-methacryloylaminomethyl-4-(1,1,1,3,3-tetramethylbutyl) phenol, CHMA is cyclohexyl methacrylate, and LA82 is 1,2,2,6,6-pentamethyl-4-pyperidyl methacrylate: Adekastah LA82 (trade name) manufactured by Adeka Corporation, and FMID is 1 mole of ε-caprolactone adduct of 2-hydroxyethyl methacrylate: Placcel FMID (trade name) manufactured by Daicel Chemical Industries Ltd.

TABLE 1

|  |  | No. 1 | No. 2 | No. 3 | No. 4 | No. 5 | No. 6 | No. 7 |
|---|---|---|---|---|---|---|---|---|
| Monomer composition (part) | UVA1 | 30 | — | — | — | — | 30 | 30 |
|  | UVA2 | — | 30 | — | — | 30 | — | — |
|  | UVA3 | — | — | 50 | — | — | — | — |
|  | UVA4 | — | — | — | 40 | — | — | — |
|  | MMA | 57 | 49 | 29 | 46 | 49 | 57 | 55 |
|  | 2EHA | 8 | 6 | 5 | 8 | 6 | 8 | — |
|  | HEMA | 5 | 10 | 15 | 5 | 10 | 5 | — |
|  | CHMA | — | 5 | — | — | 5 | — | — |
|  | LA82 | — | — | 1 | 1 | — | — | — |
|  | FMID | — | — | — | — | — | — | 15 |
| Initiator (part) |  | 1.0 | 0.05 | 10 | 0.5 | 0.02 | 10 | 1.0 |
| Non-volatile part (%) |  | 50.0 | 50.0 | 50.0 | 50.0 | 50.0 | 50.0 | 50.0 |
| Weight-average molecular weight (Mw) |  | 32000 | 285000 | 12000 | 97000 | 312000 | 9000 | 125000 |
| Polymer No. |  | 1 | 2 | 3 | 4 | 5 | 6 | 7 |

Example 1

In a container were loaded 200 parts (wet) of the polymer obtained in Synthesis example 1, 2 parts of saturated polyester resin: Vylon GK880 (registered trademark; Mn 18000, denoted as Vylon 1) manufactured by Toyobo Co., Ltd. and 6.9 parts of polyisocyanate based crosslinker: Desmodur N3200 (registered trademark) manufactured by Sumika Bayer Urethane Co Ltd., further diluted with ethyl acetate so that non-volatile part became 20% solution to prepare a resin composition for forming an ultraviolet absorbing layer (resin liquid).

To evaluate the stability of this resin liquid, a suitable amount was sampled immediately after the liquid was prepared to measure a viscosity with a B type viscometer. The viscosity was also measured after the liquid was allowed to stand at 25° C. for 24 hours with a B type viscometer, and the stability of resin liquid was evaluated from an increase in viscosity by the following criterion:

O: (good): (viscosity after 24 hour standing−initial viscosity) is less than 5 mPa·s Δ: (partly inferior): (viscosity after 24 hour standing−initial viscosity) is 5 mPa·s or more, less than 10 mPa·s x: (inferior): (viscosity after 24 hour standing−initial viscosity) is 10 mPa·s or more Also, the above resin liquid was coated on a untreated PET film of 25 μm thick (surface wetting index of 34 mN/m) by a bar coater and dried at 100° C. for 1 minute, and an ultraviolet absorbing layer with film thickness of 10 μm was formed, thereby to obtain a laminate that an ultraviolet absorbing layer was formed on PET film.

The laminate was measured for yellowing factor Δb by the foregoing method. The cross-cut adhesion was also measured by the foregoing method. The initial cross-cut adhesion before weather resistance test and the adhesion after irradiation of ultraviolet light of the same irradiation amount and irradiation time as in the measurement of yellowing factor Δb were measured. Further, the curl resistance was also measured by the foregoing method.

The results of various measurements are shown in Table 2. Additionally, Vylon 2 in Table 2 is a saturated polyester resin: Vylon 200 (Mn 6000) manufactured by Toyobo Co., Ltd., and Espel is a saturated polyester resin: Espel 9940Z-37 (Mn 10000) manufactured by Hitachi Chemical Co., Ltd. and a melamine based crosslinker is Cymel 370 manufactured by Mitsui Cytec, Ltd.

Examples 2-6, Reference Examples 1-2. Comparative Examples 1-4

A laminate having an ultraviolet absorbing layer formed on PET film was obtained in the same manner as in Example 1 except that the formulated composition was changed as shown in Table 2. Additionally, Example 5 employed an untreated polyethylene naphthalate film of 25 μm thick (surface wetting index of 34 mN/m). The evaluation results of stability of resin liquid, yellowing factor Δb and cross-cut adhesion are shown in Table 2.

TABLE 2

| | | Example | | | | | | Reference Example | | Comparative Example | | | |
|---|---|---|---|---|---|---|---|---|---|---|---|---|---|
| | | 1 | 2 | 3 | 4 | 5 | 6 | 1 | 2 | 1 | 2 | 3 | 4 |
| Ultraviolet absorbing polymer (part) | Polymer 1 | 200 | — | — | 200 | — | — | — | — | 200 | — | 200 | 200 |
| | Polymer 2 | — | 200 | — | — | — | — | — | — | — | — | — | — |
| | Polymer 3 | — | — | 200 | — | — | — | — | — | — | 200 | — | — |
| | Polymer 4 | — | — | — | — | 200 | — | — | — | — | — | — | — |
| | Polymer 5 | — | — | — | — | — | — | 200 | — | — | — | — | — |
| | Polymer 6 | — | — | — | — | — | — | — | 200 | — | — | — | — |
| | Polymer 7 | — | — | — | — | — | 200 | — | — | — | — | — | — |
| Saturated polyester resin (part) | Vylon 1 | 2 | 1 | 5 | 0.5 | — | 2 | 2 | 2 | 0 | 8 | 2 | — |
| | Vylon 2 | — | — | — | — | — | — | — | — | — | — | — | 2 |
| | Espel | — | — | — | — | 3 | — | — | — | — | — | — | — |
| Polyisocyanate based crosslinker (part) | | 6.9 | 14 | 21 | 6.9 | 6.9 | 11.0 | 14 | 6.9 | 6.9 | 21 | — | 6.9 |
| Melamine based crosslinker (part) | | — | — | — | — | — | — | — | — | — | — | 5 | — |
| Stability of resin liquid (standing at 25° C.) | | O | O | O | O | O | O | X | O | O | Δ | O | O |
| Thickness of ultraviolet absorbing layer (μm) | | 10 | 10 | 12 | 10 | 10 | 10 | 10 | 10 | 10 | 12 | 10 | 10 |
| Yellowing factor Δb | | O | O | O | O | O | O | O | O | O | X | Δ | O |
| Cross-cut adhesion (%) | Initial | 100 | 100 | 100 | 100 | 100 | 100 | 100 | 100 | 0 | 100 | 0 | 0 |
| | After UV irradiation | 100 | 100 | 100 | 100 | 100 | 100 | 100 | 90 | 0 | 100 | 0 | 0 |
| Curl resistance | | O | O | O | O | O | O | O | O | X | O | X | Δ |

INDUSTRIAL APPLICABILITY

A resin composition for forming an ultraviolet absorbing layer of the present invention contains a saturated polyester resin in a specific amount, so that an ultraviolet absorbing layer having excellent adhesion to various plastic substrates, especially an untreated plastic film on which adhesion enhancing treatment had not been performed, was able to be formed. As a result, it became possible to provide a laminate having excellent curl resistance and yellowing resistance with low costs.

A resin composition for forming an ultraviolet absorbing layer of the present invention can be used in deterioration protection applications for protecting contents and substrates from ultraviolet light, for example, coating agents for forming an ultraviolet absorbing layer such as packaging materials of medicines, foods etc. and on glass bottles. There can be also used as coating agents for preventing coloring material like dyes from color deterioration, agglutinants and adhesives for bonding plastic substrates each other like fluorine resin films, or primers for hard coat layers of silicone type and acryl type. Furthermore, it can be used in recording liquid with weather resistance, fiber treating agents and insulation coating agents of insulating devices and display devices.

A laminate comprising an ultraviolet absorbing layer of the present invention including a laminate expressed as film can be used as recording materials for such as reversible heat sensitive product, melt transfer, sublimation transfer, ink jet, heat sensitive product, IC card and IC tag, packaging materials for medicines, foods etc., back sheets for solar battery, marking films, heat sensitive resin plates, adhesive sheets, dye sensitizing solar battery, polymer solid electrolyte, ultraviolet absorbing insulation film various type optical films such as polarization plate protecting film, anti-reflection film, reflection film and light diffusion film, films for building materials such as glass anti-scattering film, decoration film and film for window, indoor and outdoor overlay films such as display materials and electric spectacular signboards and shrink film.

The invention claimed is:

1. A resin composition for use in forming an ultraviolet absorbing layer on the surface of a plastic substrate, having an ultraviolet absorbing polymer as a major component being synthesized from monomer mixtures containing an ultraviolet absorbing monomer, wherein the resin composition contains 0.5-5 parts by mass of a saturated polyester resin with a number-average molecular weight of 10,000 or higher and 0.1-30 parts by mass of a polyisocyanate based crosslinker relative to 100 parts by mass of the ultraviolet absorbing polymer, wherein the ultraviolet absorbing polymer has a weight-average molecular weight (Mw) in the range of 10,000 to 300,000, and the ultraviolet absorbing monomer is at least one monomer selected from the group consisting of a monomer represented by formula (2):

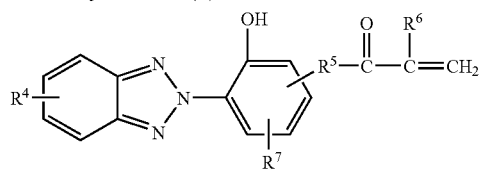

(2)

wherein $R^4$ represents a hydrogen atom, a halogen atom, an alkyl group with a carbon number of 1-8, an alkoxy group with a carbon number of 1-4, a cyano group or a nitro group, $R^5$ represents a linear or branched alkylene group having an element with a carbon number of 1-12, —$R^8$—O—, wherein $R^8$ represents a linear or branched alkylene group with a carbon number of 2 or 3, or a group having an element capable of forming a hydrogen bond, $R^6$ represents a hydrogen atom or a methyl group, and $R^7$ represents a hydrogen atom or a hydrocarbon group with a carbon number of 1-8;

a monomer represented by formula (3):

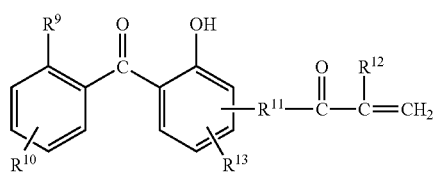

(3)

wherein $R^9$ represents a hydrogen atom or a hydroxyl group, $R^{10}$ represents a hydrogen atom or an alkoxy group with a carbon number of 1-6, $R^{11}$ represents —O—, OCH$_2$CH$_2$O—, —OCH$_2$CH(OH)CH$_2$O—, $R^{12}$ represents a hydrogen atom or a methyl group, and $R^{13}$ represents a hydrogen atom or a hydrocarbon group with a carbon number of 1-8;

and a monomer represented by formula (4):

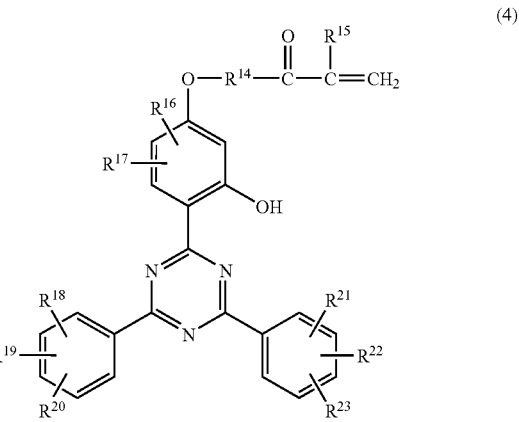

(4)

wherein $R^{14}$ represents a direct bond, —(CH$_2$CH$_2$O)n— or —CH$_2$CH(OH)—CH$_2$O—, wherein n represents an integer of 1 to 5, $R^{15}$ represents a hydrogen atom or a methyl group, and $R^{16}$ through $R^{23}$ each independently represents a hydrogen atom, an alkoxy group, an alkenyl group or an alkyl group having a carbon number of 1 to 10.

2. A laminate comprising an ultraviolet absorbing layer formed on the surface of a plastic substrate, wherein the ultraviolet absorbing layer comprises the resin composition according to claim 1, and wherein the laminate has a yellowing factor Δb of 2 or less before and after irradiation by ultraviolet light at 120 mW/cm$^2$, wherein the ultraviolet light is applied to the ultraviolet absorbing layer for 240 hours under an atmosphere at 80° C. and 60% RH, and the laminate has a cross-cut adhesion rating of 95% or higher between the plastic substrate and the ultraviolet absorbing layer.

* * * * *